United States Patent [19]

Barlow, Sr.

[11] 4,219,072
[45] Aug. 26, 1980

[54] PHASE CHANGE MATERIAL HEAT EXCHANGER

[76] Inventor: Donald W. Barlow, Sr., Rte. 3, Box 295, Dover, Fla. 33527

[21] Appl. No.: 876,672

[22] Filed: Feb. 10, 1978

[51] Int. Cl.² .............................................. F28D 15/00
[52] U.S. Cl. .................. 165/32; 165/104 S; 165/111
[58] Field of Search ............... 165/32, 104 S, 111; 126/400

[56] References Cited

U.S. PATENT DOCUMENTS

| | | | |
|---|---|---|---|
| 2,846,421 | 8/1958 | Pollock | 165/104 S X |
| 3,254,702 | 6/1966 | Thomason | 165/104 S X |
| 4,086,958 | 5/1978 | Lindner et al. | 165/104 S |
| 4,127,161 | 11/1978 | Clyne et al. | 165/104 S X |
| 4,146,087 | 3/1979 | Johansson | 165/104 S |

*Primary Examiner*—Albert W. Davis
*Attorney, Agent, or Firm*—Duckworth, Hobby, Allen & Pettis

[57] ABSTRACT

A phase change material heat exchanger wherein the latent heat of a substance as its physical state changes from solid to liquid, and vice versa, is utilized as a heat storage medium. Structure is also disclosed whereby a heat transfer fluid is intimately associated with the phase change material so as to accomplish the desired heat exchange between the phase change material and the heat transfer fluid. As a result of the construction utilized for the heat exchanger, the addition of homogenizing agents to the phase change material is not required.

17 Claims, 9 Drawing Figures

PHASE CHANGE MATERIAL HEAT EXCHANGER

BACKGROUND OF THE INVENTION

1. Field of the Invention

The present invention relates to a phase change material heat exchanger wherein a phase change material comprising a salt selected for its relatively high latent heat is utilized as a heat storage medium. The heat exchanger of the invention comprises a substantially closed container into which the phase change material is placed. Then, using a system of conduits and discharge heads, a heat transfer fluid is passed through the phase change material so as to allow a heat energy exchange therebetween. This heat transfer takes place substantially at the heat of fusion of the phase change material so as to make optimum use of the material's latent heat. By virtue of the construction of the phase change material heat exchanger the use of homogenizing agents in combination with the phase change material is not necessary. In a preferred embodiment the phase change material heat exchanger is utilized as a heat storage facility in combination with a solar heat collector of state of the art construction. Solar heat is absorbed by the heat transfer fluid and stored by the phase change material placed within the heat exchanger. If solar heat is not currently available, heat previously stored could be used to raise the temperature of the heat transfer fluid.

2. Description of the Prior Art

Recent developments in the art of solar heating and cooling have created a great need for some means of efficiently storing the energy obtained from the sun for later use, such as at night or on cloudy days. A similar need has also been recognized with regard to the efficient operation of liquid-to-air heat pump systems. Such heat storage facilities are commonly referred to as heat sinks, and the prior art teaches numerous devices for the construction and operation of such heat storage facilities.

Perhaps the simplest of such devices consists essentially of a large holding tank into which the fluid which has been heated by the sun is collected for subsequent usage, such as a home's hot water supply. Other devices teach the storage of heat within rocks placed inside a container through which the heated fluid is allowed to flow. Most state of the art heat pumps utilize the atmosphere as a heat sink, either expelling waste heat to the air or extracting heat from the atmosphere, depending upon the mode of operation of the heat pump.

Each of these state of the art devices is relatively inefficient, and this inefficiency has become a primary concern because of the high energy associated with operating devices using these primary types of heat storage facilities. At least in partial solution of these problems, the current state of the art does teach what may be termed as secondary, or second generation, heat storage facilities.

These second generation heat storage facilities basically teach the use of a heat storage medium comprising a phase change material having a heat of fusion of more than 50 BTU per pound. By "phase change material" is meant a material which undergoes a physical change, such as from a crystal to a liquid or from an hydrated crystal to a dehydrated crystal, at a functional temperature. The bulk of the prior art teaches the use of salt hydrates as the phase change material, and it is the latent heat absorbed or expelled in accomplishing the phase change which is capable of being stored by the phase change material.

U.S. Pat. No. 2,677,664, to Telkes teaches the use of Glauber's salt (sodium sulfate decahydrate) as a suitable phase change material. However, as discussed in that patent, this material and other similar salt hydrates do not easily return to their normal hydrate form when giving up heat at their critical temperature without external agitation or stirring. That is to say, free water is often formed in the supersaturated solutions. This will not only tend to damage the container and heat storage system, but also deleteriously affects the system's efficiency. Telkes '664 teaches that this problem may be overcome by the addition of borax (sodium tetraborate decahydrate) into the salt hydrate solution. The same patent recognizes that mechanical means for external agitation of sealed containers of the heat storage medium would be possible, but is undesirable because of the costs and mechanics involved.

U.S. Pat. No. 3,986,969, also to Telkes teaches yet another solution to the problem of free water formation comprising not only the addition of borax as a nucleating agent, but also the addition of attapulgus clay (hydrous magnesium aluminum silicate) as an homogenizing agent. That patent teaches that the composition including the salt hydrate plus borax and clay maintains the salt hydrate in suspension during repeated heating and cooling cycles.

Still other examples of the use of phase change materials in heat storage and heat exchange devices are found in the following U.S. Patents: Nos.

| | |
|---|---|
| Telkes | 2,677,367 |
| Telkes | 2,808,494 |
| Van Vechten | 3,937,209 |
| Boer | 3,960,207 |
| Switzgable | 3,991,936 |
| Chubb | 3,997,001 |
| Telkes | 4,010,620 |

In addition to the crystallization/recrystallization problems discussed above, these patents also identify certain other problems found in state of the art heat exchanger devices using phase change material. For example, inasmuch as the phase change material usually consists essentially of a salt or a salt hydrate, direct contact of the phase change material with water is undesirable. Furthermore, because of the corrosive nature of the phase change materials utilized, relatively sophisticated and complex mechanical scraping, cleaning and agitating devices must often be utilized in the systems.

Accordingly, it is clear that there is a great need in the art for a heat exchanger construction wherein a phase change material may be efficiently utilized for the purpose of alternately storing and releasing heat energy. Such a heat exchanger device should be suitable for use in combination with existing heating and cooling systems and should be of relatively simple construction so as to provide long lasting, maintenancefree operation. For purposes of efficiency, it would also be desirable to utilize the phase change material in an unadulterated form without the necessity of incorporating nucleating and homogenizing agents.

SUMMARY OF THE INVENTION

The present invention relates to a phase change material heat exchanger wherein the latent heat of fusion of a phase change material is utilized as a heat storage medium. With the advent of solar-based heating and cooling systems, it has been determined that the use of a phase change material as the heat storage facility offers a predictable, relatively narrow band of operating temperature which permits radically improved efficiency in both cooling and heating modes. As will be set forth in greater detail below, the present invention utilizes such a phase change material in combination with unique mechanical structures whereby heat exchange between the phase change material and a heat transfer fluid may be efficiently conducted without deleteriously affecting the heat storage capabilities of the phase change material. Briefly stated, the heat exchange takes place by passing a fluid into intimate contact with the phase change material. Dependent upon the operating condition of the system to which the heat exchanger is connected, heat will pass from the phase change material into the heat transfer fluid, or from the heat transfer fluid into the phase change material. For example, the phase change material could be utilized to store heat energy absorbed by the heat transfer fluid as it passed through a solar collector. Conversely, latent heat of fusion from the phase change material could be utilized to warm the heat transfer fluid for subsequent extraction from that fluid by a heating system.

In one embodiment of the phase change material heat exchanger of the present invention the phase change material is encapsulated within a plurality of discrete, substantially spherical capsules. The capsule, of course, must be formed from a material which is substantially inert with regard to the phase change material, such as, for example, a plastic. It is also contemplated that metals could be utilized. The encapsulated phase change material is then placed within a closed container and supported in spaced apart relation from the bottom of that container by a capsule support means in the nature of a perforated plate.

An inlet means is provided for the introduction of the heat transfer fluid into the container containing the encapsulated phase change material. This inlet means basically comprises a conduit extending from the top to a point substantially adjacent the bottom of the container and below the capsule support means. Disposed at the bottom end of the inlet conduit is a discharge head including a plurality of radially extending spokes having apertures formed therethrough. Heat transfer fluid passes through the apertures in the spokes and flows upwardly around the encapsulated phase change material to the top of the container. Disposed adjacent the top of the container, and in fluid communicating relation thereto, is a heat transfer fluid outlet means whereby the heat transfer fluid may be removed from the container for subsequent usage in the system to which the heat exchanger is connected.

By virtue of this encapsulated structure for the phase change material it has been determined that the use of additional compositions in the nature of nucleating and homogenizing agents are not required. Furthermore, external agitation or stirring means is not necessary, for the heat transfer fluid sufficiently agitates the phase change material as it flows upwardly through the capsules. Accordingly, the phase change material exhibits extreme efficiency in reversibly alternating between its solid and liquid states.

In a second embodiment of the phase change material heat exchanger the phase change material is not encapsulated but, rather, is placed directly into the heat exchanger container in the form of a supersaturated solution containing an excess of phase change material crystals. A similar construction for the heat transfer fluid inlet means is utilized; however, the discharge means of this embodiment comprises a plurality of discharge heads serially connected to the inlet means by a corresponding plurality of discharge conduits. As in the first embodiment each of the discharge heads does comprise a plurality of radially extending spokes having apertures formed therethrough. The discharge heads are arranged in a spaced apart, stacked array from the top to the bottom of the container. Furthermore, the apertures formed in the spokes of each discharge head are oriented toward the bottom of the container so that the heat transfer fluid is discharged in a relatively downward direction. At this point it should also be noted that inasmuch as the heat transfer fluid will directly contact the phase change material, the heat transfer fluid must be selected from a class consisting of materials which are not only inert with regard to the phase change material but also are not solvents therefore. While a more detailed discussion of the heat transfer fluid will be presented below, it is sufficient to note at this point that relatively low viscosity oils are contemplated for use in this second embodiment.

The fluid inlet means of this embodiment further comrises a series of check valves so as to regulate, in predetermined fashion, through which of the plurality of discharge heads the heat transfer fluid will flow. In order to obtain maximum interface between the heat transfer fluid and the phase change material, it is preferred that the heat transfer fluid be discharged from the one discharge head disposed in closest proximity to the bottom of the container in which the phase change material has been placed. However, owing to the nature of the phase change material and the wide variety of operating conditions which might be encountered, it is known that part, or all of the phase change material may "freeze," presenting a block of material through which the heat transfer fluid simply cannot flow. Accordingly, the check valves include adjustment means whereby each of the check valves is adjustable to open at a predetermined pressure of the heat transfer fluid. No check valve is provided adjacent the discharge head closest to the bottom of the container. That is to say that this individual discharge head will always present the least flow resistance and the heat transfer fluid will pass therethrough presuming total fluidity of the phase change material. Each of the remaining discharge heads does include a check valve operatively connected thereto, and these check valves are adjusted so as to require greater fluid pressure to open them as they progress from the bottom of the container to the top of the container.

A segregator means in the nature of a preforated screen is provided within the container at a position below the discharge head most proximate the container's top. The primary function of the segregator means is to prevent passage of the phase change material from the container into the outlet means which will be described below. Accordingly, substantially all of the phase change material is retained within the container below the segregator means. Of course, it should be obvious that the segregator means is permeable to the heat transfer fluid but is relatively impermeable to the phase change material. A second, important function is accomplished by the segregator means.

Inasmuch as virtually all the phase change material is retained below the segregator means, even if the entire mass of phase change material were to "freeze" the discharge head positioned above the segregator means would still be available for the flow of heat transfer fluid therethrough. In such a situation this flow onto the top of the "frozen" mass of phase change material would tend to melt that material as its heat of fusion was obtained. Then, owing to the serial construction of discharge heads and corresponding check valves, successively lower discharge heads would open, eventually resulting in a fluid phase change material bed from top to bottom.

As the heat transfer fluid passes from the inlet means, through the phase change material, and back to the top of the container, the heat transfer fluid is removed from the heat exchanger by fluid outlet means comprising a conduit disposed in fluid communicating relation to the heat transfer fluid substantially adjacent the top of the container. As a precautionary measure the end of the outlet means within the container is provided with a filter to prevent any phase change material from entering the system to which the heat exchanger is connected.

Having thus set forth the basic construction for the phase change material heat exchanger of this invention, attention is invited to certain considerations with regard to the phase change material and the heat transfer fluid. As stated above in the Description of the Prior Art, the use of phase change material as heat sinks is known in the prior art. In fact, each of the patents referred to above disclose such materials. Of course, a particular phase change material is chosen with primary regard to the operating conditions which the system will encounter. It is therefore intended that the scope of the present invention does include any phase change material possessing a latent heat of fusion appropriate for the operating conditions of the heat exchanger. Nevertheless, prime consideration in the development of this invention has been given to salts and salt hydrates such as, for example, calcium chloride and sodium sulfate decahydrate.

With regard to the heat transfer fluid, reference is again made to the parameters set forth in the preceding brief description. In the encapsulated embodiment of the invention virtually any heat transfer fluid may be utilized for the reason that the fluid will not come into direct contact with the phase change material. It is contemplated that this encapsulated embodiment will be particularly useful in installations where the use of water as the heat transfer fluid is desired. Of course, other fluids could also be utilized. However, in the second embodiment wherein the heat transfer fluid intimately contacts the phase change material itself, water as the heat transfer fluid is not acceptable. In this embodiment experimentation has shown hydrocarbon and silicon oils to be most efficacious.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings, in which.

Similar reference characters refer to similar parts throughout the several views of the drawings.

DETAILED DESCRIPTION

Figure 1:
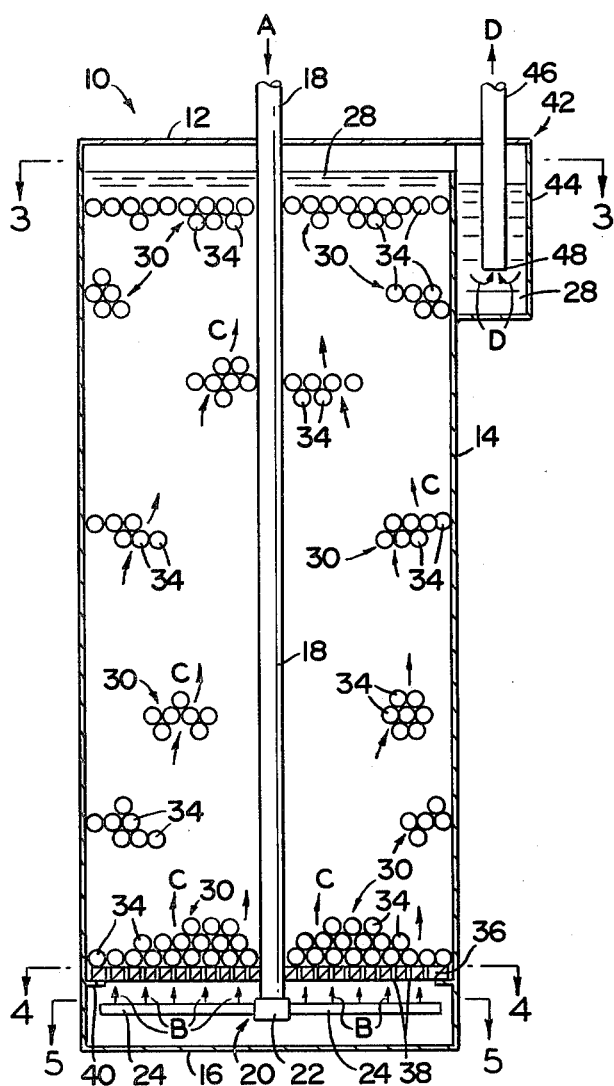
FIG. 1 is an elevational view, in section, of a first embodiment for the phase change material heat exchanger.
Figure 5:
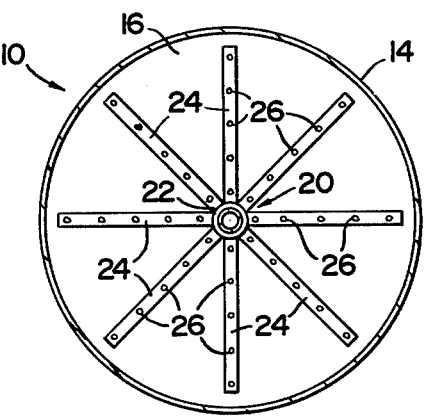
FIG. 5 is a sectional view taken along line 5—5 of FIG. 1.

The present invention relates to a construction for a phase change material heat exchanger, a primary embodiment of said heat exchanger being generally indicated as 10 in the view of FIG. 1. As shown therein heat exchanger 10 comprises a container means including top 12, side 14 and bottom 16 to define a substantially closed volume. A heat transfer fluid inlet means comprising an inlet conduit 18 is disposed in fluid communicating relation with the interior of the container means and includes a discharge means generally indicated as 20 disposed on the interior end of inlet conduit 18. As most clearly seen in the view of FIG. 5, discharge means 20 comprises a discharge head 22 including a plurality of radially extending spoke means 24 disposed thereon. Each of the spoke means 24 further includes a plurality of inlet apertures 26 formed therethrough so as to allow passage of a heat transfer fluid. This flow of heat transfer fluid is indicated schematically in the view of FIG. 1 by directional arrows A through inlet conduit 18, B from inlet apertures 26, and C through the interior of the container means. As further shown in the view of FIG. 1, heat transfer fluid 28 substantially fills the interior of the container means.

Figure 2:
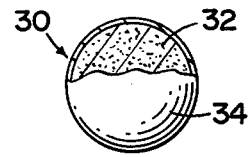
FIG. 2 is a detail view, partially in section, of the phase change material.
Figure 3:
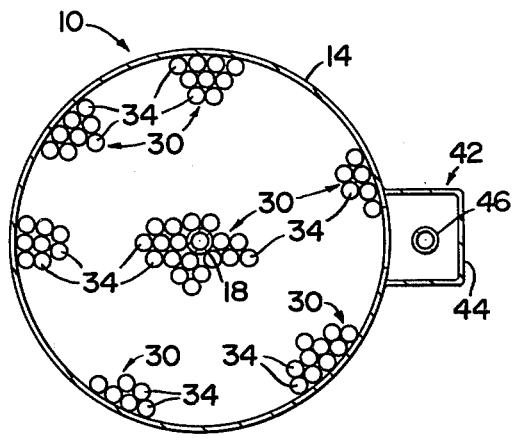
FIG. 3 is a sectional view taken along line 3—3 of FIG. 1.

Phase change material heat exchanger 10 further comprises a phase change material generally indicated as 30 placed within the container means and surrounded by heat transfer fluid 28. Notwithstanding the partial representation of FIG. 1, it is to be understood that phase change material 30 is placed within the container means so as to substantially fill its closed volume. With particular regard to the detailed view of FIG. 2, it can be seen that phase change material 30 comprises a salt 32, a predetermined quantity of which is enclosed by capsule means 34. In this preferred embodiment salt 32 consists essentially of calcium chloride, and capsule means 34 is formed from a plastic material. Inasmuch as salt 32 is enclosed by the plurality of capsule means 34, heat transfer fluid 28 of this embodiment may comprise water. Of course, virtually any relatively low viscosity fluid may be utilized as heat transfer fluid 28 so long as the particular fluid chosen is substantially inert with regard to capsule means 34.

Figure 4:
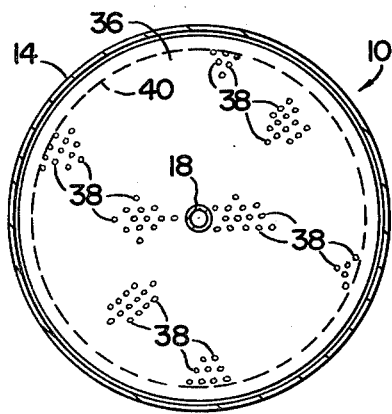
FIG. 4 is a sectional view taken along line 4—4 of FIG. 1.

As best seen in the views of FIGS. 1 and 4, phase change material 30 is maintained in a fixed, spaced apart relation with regard to discharge means 20 by capsule support means 36. As shown in those views capsule support means 36 comprises a plate including a plurality of heat transfer fluid apertures formed therethrough. Capsule support means 36 is maintained in the position shown in FIG. 1 by its placement around inlet conduit 18 onto support ledge 40 formed on the interior of side 14.

A heat transfer fluid outlet means generally indicated as 42 is formed substantially adjacent top 12 of heat exchanger 10 and in fluid communicating relation to heat transfer fluid 28. As most clearly seen in the view of FIG. 1, heat transfer fluid outlet means 42 comprises overflow well means 44 into which the warm or cool fluid 28 will flow, and outlet conduit 46 one end 48 of which is in fluid communicating relation to fluid 28 with end well means 44. Accordingly, fluid 28 is removed from well means 44 through conduit 46 as indicated by directional arrows D.

In operation, phase change material heat exchanger 10 is operatively connected to a work unit, such as, for example, a heat pump, during the operation of which an exchange of heat energy is desired. In this example wherein phase change material 30 comprises calcium chloride salt 32, the heat transfer fluid 28 utilized is water. Calcium chloride has a melting point of about 81° F. and a latent heat of fusion equivalent to approximately 8,774 BTU per cubic foot. Dependent upon the mode of operation and, therefore, the temperature of incoming transfer fluid 28, heat energy is stored in or absorbed from calcium chloride salt 32. This heat transfer is accomplished with extreme efficiency for the reason that fluid 28 intimately contacts each of the capsules 34 including salt 32 placed therein. This intimate contact also has a stirring or mixing effect on the phase change material 30 so as to provide for truly reversible physical state changes of salt 32 from crystal to liquid and vice versa. Presuming that phase change material 30 is in an operating mode for the collection of heat energy, salt 32 within each of the capsules 34 absorbs heat from the heat transfer fluid 28 passing therearound, and the cooled fluid 28 then exits through outlet means 42 to begin another cycle.

It is, of course, to be understood that by virtue of the fact that phase change material heat exchanger 10 is preferably operated at the heat of fusion of salt 32, relatively large quantities of heat may be retained and/or rejected owing to the salt's latent heat of fusion.

Attention is now invited to the views of FIGS. 6-9, inclusive, wherein a second embodiment of the phase change material heat exchanger is generally indicated as 50. Inasmuch as many structural elements of this second embodiment 50 are identical to those of the primary embodiment 10, similar reference numerals have been utilized where appropriate.

Figure 6:
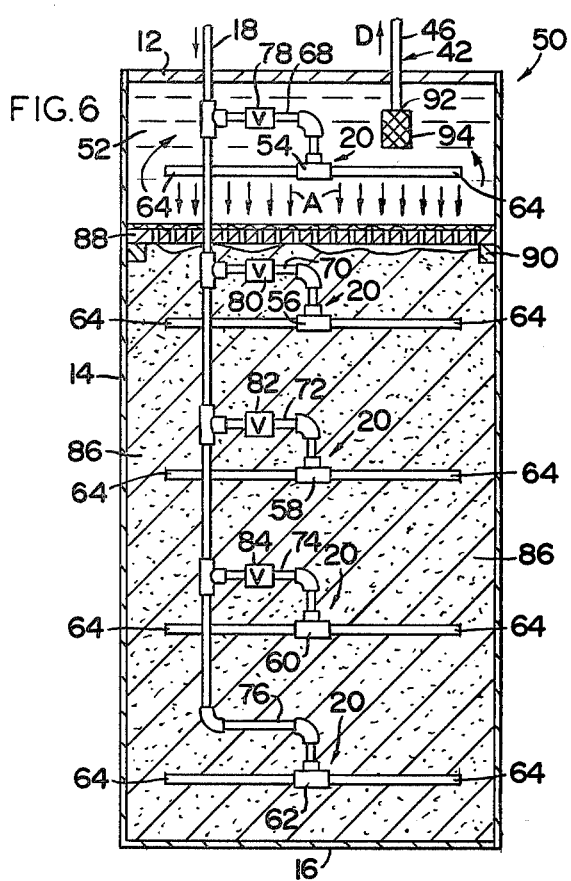
FIG. 6 is an elevational view, in section, of a second embodiment of the phase change material heat exchanger showing its operation when the entire mass of phase change material is frozen.
Figure 7:
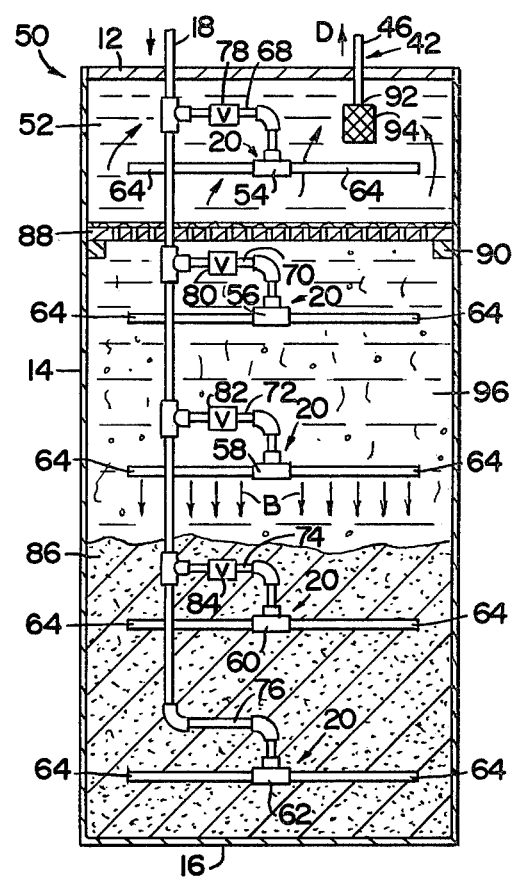
FIG. 7 is a sectional view similar to that of FIG. 6 showing the operation of the phase change material heat exchanger when only a portion of the phase change material is in a fluid state.
Figure 8:
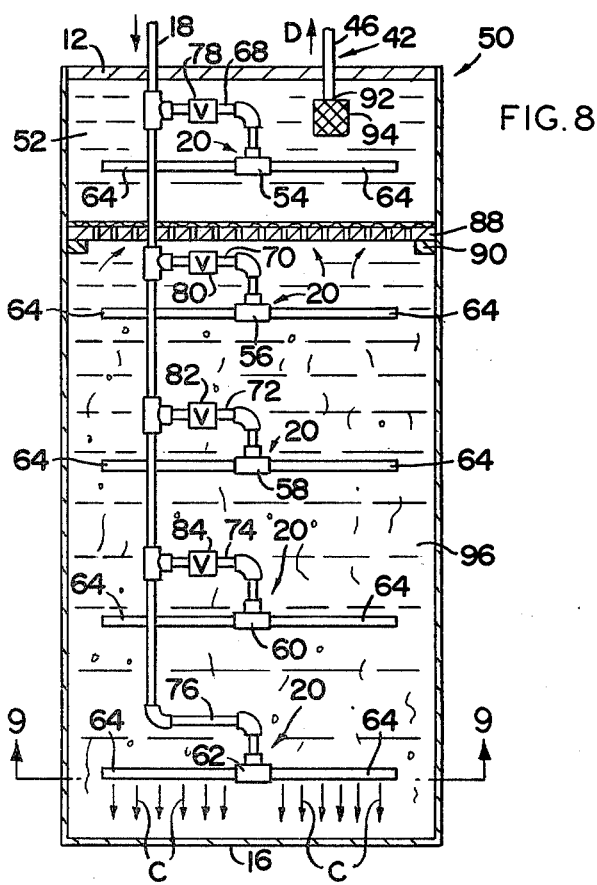
FIG. 8 is a sectional view similar to that of FIG. 6 showing the preferred mode of operation for this embodiment of the phase change material heat exchanger.
Figure 9:
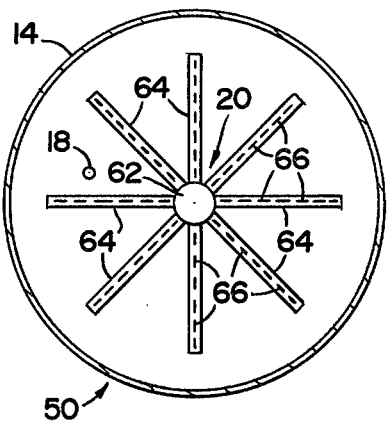
FIG. 9 is a sectional view taken along line 9—9 of FIG. 8.

As seen in the view of FIG. 6, this embodiment of phase change material heat exchanger 50 also comprises a container means having a top 12, sides 14, and a bottom 16 to define a substantially closed volume. An inlet conduit 18 is provided for the introduction of a heat transfer fluid, herein designated as 52, into the container means. Discharge means 20 of this embodiment comprises a plurality of discharge heads identified as 54, 56, 58, 60 and 62. As most clearly seen in the view of FIG. 9, discharge head 62 comprises a plurality of radially extending spoke means 64, each of said spoke means 64 further comprising a plurality of orifices 66 formed therethrough and oriented in the direction of bottom 16. The remaining discharge heads 54, 56, 58 and 60 are similarly constructed as indicated in the views of FIGS. 6, 7 and 8. Those figures also illustrate the fact that each of the discharge heads 54-62 is interconnected in fluid communicating relation to inlet conduit 18 by a corresponding plurality of discharge conduits 68, 70, 72, 74 and 76.

In order to regulate the open/close condition of each of the discharge heads 54-60, adjustable check valves 78, 80, 82 and 84 are disposed in fluid flow regulating position in corresponding discharge conduits 68-74. Each of the check valves 78-84 is adjusted so as to open only upon reaching a predetermined pressure of heat transfer fluid 52. Of course, it should be obvious that discharge head 62 is always in an open position, for no check valve is provided. Check valve 84 requires relatively less pressure to open than does check valve 82. Similarly, check valve 82 requires less pressure to open than does check valve 80, and check valve 78 requires the greatest pressure to open. By virtue of this construction, heat transfer fluid 52 will be discharged from only one of the discharge means 20 at any given operating condition, and this will be explained in greater detail below.

Now with particular attention to the view of FIG. 6, it can be seen that the interior of the phase change material heat exchanger 50 is substantially filled with phase change material 86 illustrated in the view of FIG. 6 in its substantially solid or "frozen" state. A segregator means 88 is disposed at the top of phase change material 86 and supported in that position by segregator ledge 90. As will be described below, segregator means 88 is permeable to heat transfer fluid 52, but substantially impermeable to phase change material 86, which in this embodiment comprises sodium sulfate decahydrate salt. Inasmuch as heat transfer fluid 52 will contact the phase change material 86 intimately, it is to be understood that heat transfer fluid 52 and phase change material 86 are to be immiscible. Again, with specific regard to the embodiment of FIGS. 6-9, the heat transfer fluid 52 comprises a low viscosity hydrocarbon oil. Of course, silicon-type fluids could also be utilized.

Finally, with regard to structural elements, phase change material heat exchanger 50 further comprises heat transfer fluid outlet means generally indicated as 42 and comprising an outlet conduit 46 disposed in fluid communicating relation to the interior of the container means. As shown in the views of FIGS. 6, 7 and 8, end 92 of outlet conduit 46 disposed within heat transfer fluid 52 is provided with a filter means 94. Filter means 94 is primarily intended as a precautionary device to preclude entry of phase change material 86 into the system serviced by phase change material heat exchanger 50.

Having thus set forth the structural elements of this second embodiment and their relationships to each other, attention is now invited to the following description of the operation of phase change material heat exchanger 50 as shown in FIGS. 6, 7 and 8.

The view of FIG. 6 illustrates the heat exchanger 50 wherein virtually all of the sodium sulfate decahydrate phase change material 86 is in a solid state. Accordingly, orifices 66 of discharge heads 62, 60, 58 and 56 are closed. The pressure of heat transfer fluid 52 will rise to the point where check valve 78 opens, and heat transfer fluid 52 will be discharged from discharge head 54 as indicated by arrows A. The relatively warmer heat transfer fluid 52 will pass through segregator means 88 and, in effect, thaw phase change material 86 by raising its temperature to its heat of fusion, which for sodium sulfate decahydrate is about 87° F. This action will create a slurry, or fluidized bed, designated by the numeral 96 in FIGS. 7 and 8 and comprising a supersaturated solution of sodium sulfate decahydrate plus heat transfer fluid 52. It is within this slurry 96 that the most efficient heat exchange takes place, utilizing the latent heat of fusion of the phase change material 86.

Then, as more of the phase change material 86 "melts" successively lower discharge heads open. As illustrated in the view of FIG. 7, slurry 96 has formed so as to permit passage of heat transfer fluid 52 from discharge head 58, as indicated by directional arrows B.

Finally, FIG. 8 illustrates the preferred physical condition of heat exchanger 50 wherein substantially all of the phase change material 86 is contained within slurry 96, so that heat transfer fluid 52 flows from discharge head 62 as indicated by directional arrows C. This is preferred for the reason that substantially all of the phase change material 86 is being utilized for heat transfer at the latent heat level. Furthermore, inasmuch as heat transfer fluid 52 enters at the bottom of the container means, slurry 96 is in a relatively constant state of agitation thereby providing for efficient, reversible transition of the sodium sulfate decahydrate back and forth from its solid to liquid stages without the creation of free water.

The heat transfer cycle is concluded by the removal of either the heated or warmed transfer fluid 52 through outlet means 42 as indicated by directional arrow B.

It is to be understood that there are numerous phase change materials which lend themselves to various useful temperature plateaus. The example illustrated in the views of FIGS. 6–9 utilizes sodium sulfate decahydrate as the phase change material for use in conjunction with a heat pump for heating and cooling a home. As previously stated, the melting point of sodium sulfate decahydrate is approximately 87° F. This material is relatively inexpensive, commercially available, and has a storage capacity in excess of 10,000 BTU per cubic foot. Because this salt hydrate is slightly basic, it has the additional advantage of being relatively non-corrosive to the metals normally utilized in such systems. It should also be noted that dehydration of the salt hydrate does not occur due to the light layer of heat transfer fluid covering and sealing the material, even when the salt is "frozen," above the segregator means 88. As latent heat is removed from the liquid salt hydrate crystallization begins due to the seeding effect of the supersaturated solution. However only very small crystals form, and these small crystals are interlarded with the immiscible heat transmitting fluid. The crystals of the phase change material then are maintained in a slurry, or fluidized bed, and remain so during the normal upward movement of the heat transfer liquid.

It will thus be seen that the objects set forth above, among those made apparent from the preceding description, are efficiently attained and since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, what is claimed is:

1. A phase change material heat exchanger, said heat exchanger comprising: container means defining a substantially closed volume; heat transfer fluid inlet means disposed in fluid communicating relation with the interior of said container means, said inlet means comprising a plurality of discharge heads serially connected to said inlet means by a corresponding plurality of discharge conduits, said inlet means further comprising N-1 check valve means, wherein N equals the number of said plurality of discharge heads, one of said check valve means being disposed in fluid flow regulating position upstream of each of said plurality of discharge heads other than the one of said plurality of discharge heads positioned in closest proximity to the bottom of said interior, each of said check valve means including adjustment means whereby each of said valve means is adjustable to open at a predetermined pressure; a phase change material placed within said container means, said phase change material being utilized in sufficient quantity to fill at least most of said container means; heat transfer fluid outlet means disposed in fluid communicating relation with the interior of said container means, said outlet means being in spaced apart relation to said inlet means; and a heat transfer fluid flowing from said inlet means through said phase change material to said outlet means, the settings of said adjustment means being graduated so that said heat transfer fluid will flow from but one of said discharge heads dependent upon the physical state of said phase change material, whereby an exchange of heat energy may take place between said phase change material and said heat transfer fluid.

2. A phase change material heat exchanger as in claim 1 wherein said phase change material comprises calcium chloride 3. A phase change material heat exchanger as in claim 1 wherein said phase change material comprises sodium sulfate decahydrate.

4. A phase change material heat exchanger as in claim 1 wherein said heat transfer fluid comprises a liquid.

5. A phase change material heat exchanger as in claim 4 wherein said liquid comprises water.

6. A phase change material heat exchanger as in claim 4 wherein said liquid comprises a hydrocarbon oil.

7. A phase change material heat exchanger as in claim 4 wherein said liquid comprises a silicon oil.

8. A phase change material heat exchanger as in claim 1 wherein each one of said plurality of discharge heads comprises a plurality of radially extending spoke means.

9. A phase change material heat exchanger as in claim 8 wherein each one of said plurality of discharge heads further comprises a plurality of orifices formed through a wall of each of said plurality of spoke means, each of said plurality of orifices communicating with said interior and being oriented toward the bottom of said interior.

10. A phase change material heat exchanger as in claim 1 wherein said adjustment means are set so that the one of said check valve means most remote from said one discharge head in closest proximity to said bottom requires the greatest heat transfer fluid pressure to open and the one of said check valve means adjacent the discharge head closest to said one discharge head requires the least heat transfer fluid pressure to open, intermediate ones of said check valve means being serially graduated therebetween.

11. A phase change material heat exchanger as in claim 1 wherein said phase change material comprises sodium sulfate decahydrate.

12. A phase change material heat exchanger as in claim 1 wherein said heat transfer fluid comprises a liquid.

13. A phase change material heat exchanger as in claim 12 wherein said liquid comprises a hydrocarbon oil.

14. A phase change material heat exchanger as in claim 12 wherein said liquid comprises a silicon oil.

15. A phase change material heat exchanger as in claim 1 further comprising segregator means disposed within said interior above the level of said phase change material and below at least one of said discharge heads, said segregator means being permeable to said heat transfer fluid and impermeable to said phase change material.

16. A phase change material heat exchanger as in claim 15 wherein said heat transfer fluid outlet means is disposed above said segregator means in fluid communicating relation to said heat transfer fluid.

17. A phase change material heat exchanger as in claim 16 wherein said heat transfer fluid outlet means comprises filter means disposed thereon, whereby said heat transfer fluid is filtered as it enters said outlet means.

* * * * *